United States Patent Office 3,450,192
Patented June 17, 1969

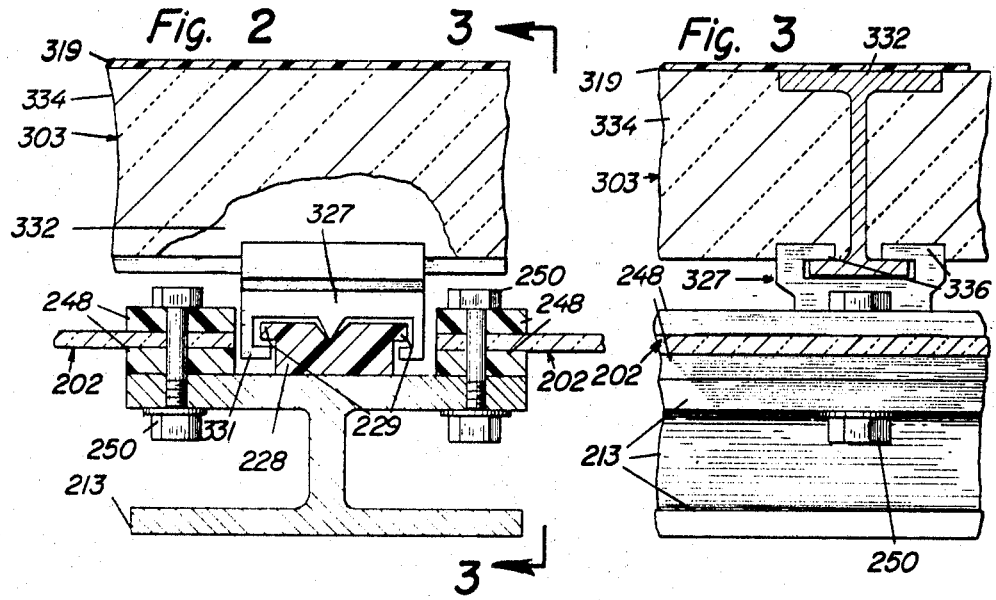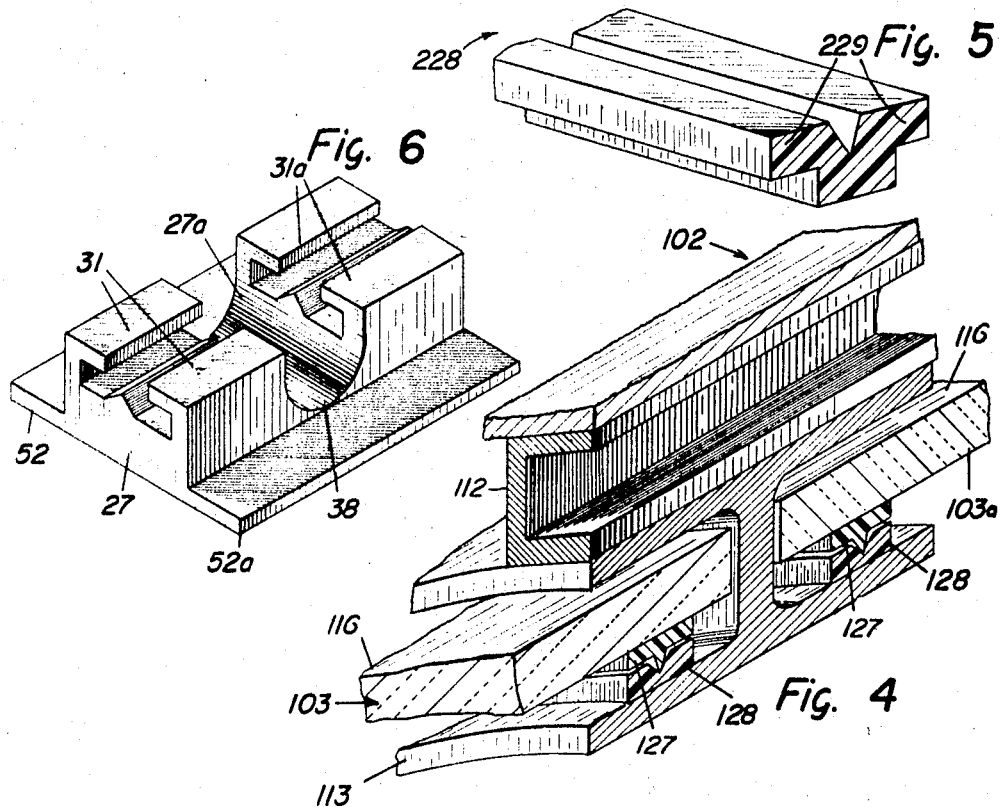

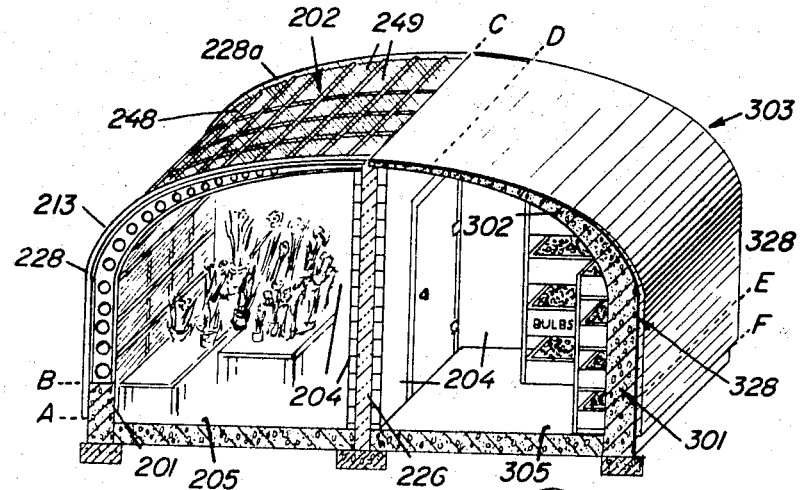
Fig. 10
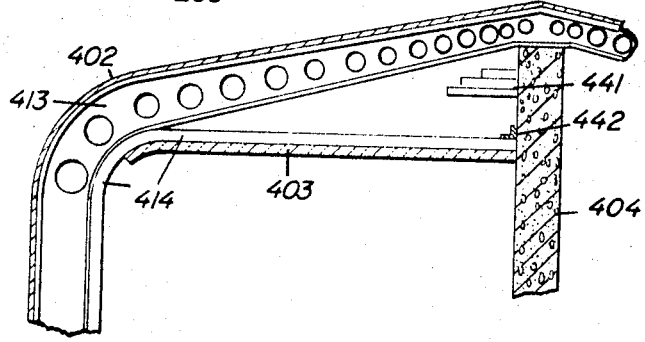
Fig. 11
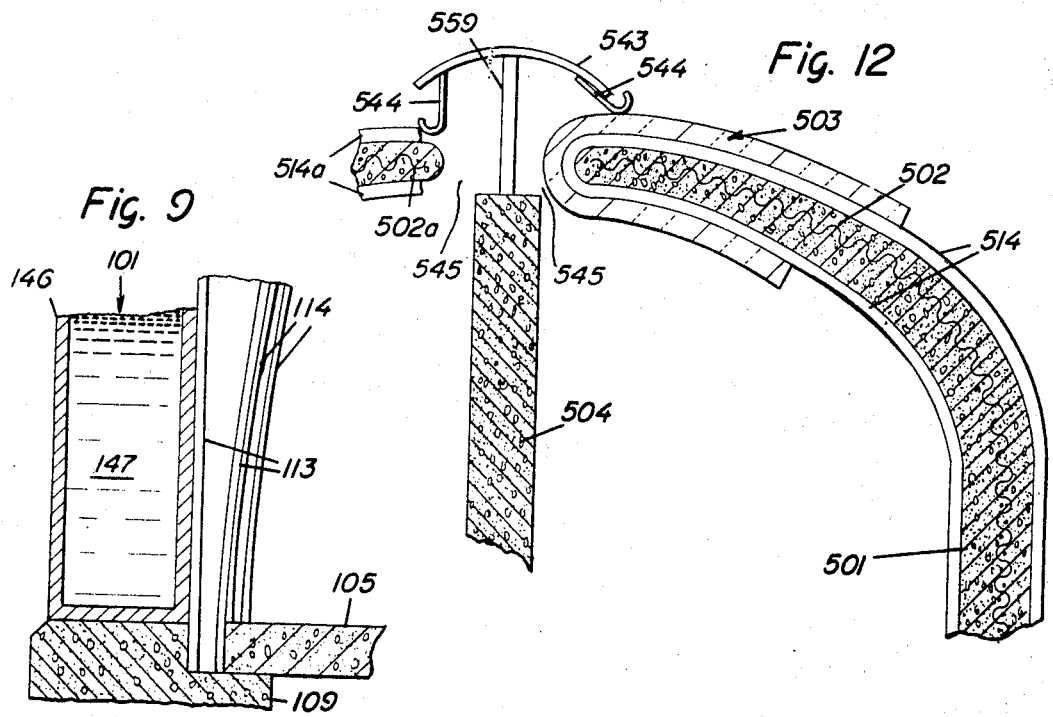
Fig. 12
Fig. 9

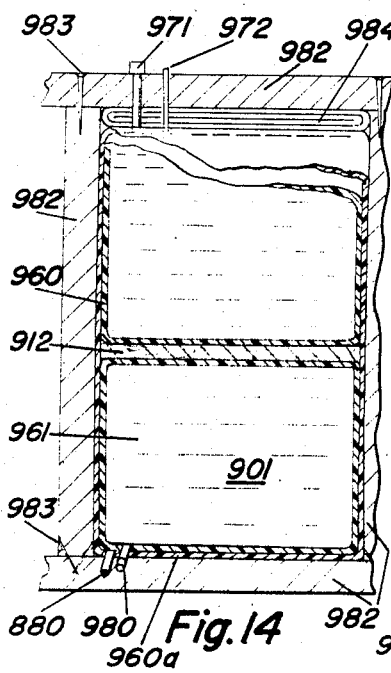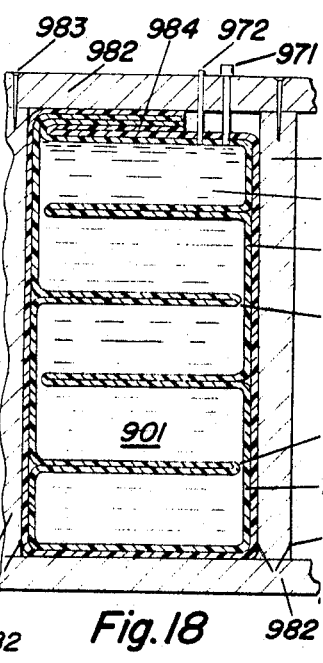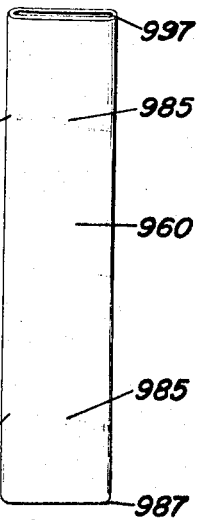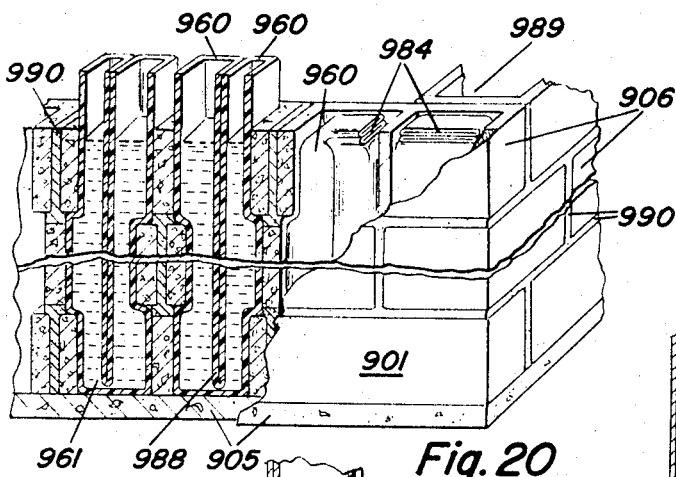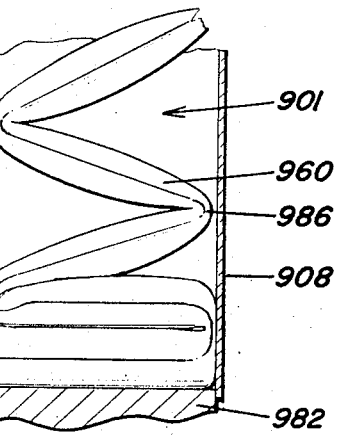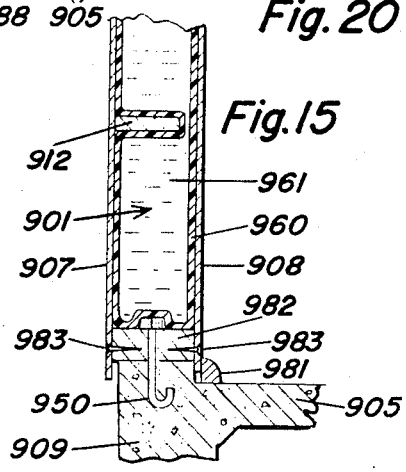

3,450,192
PROCESS AND APPARATUS FOR MODULATING THE TEMPERATURE WITHIN ENCLOSURES
Harold R. Hay, Tempe, Ariz. (795 Roble, Menlo Park, Calif. 94025)
Continuation-in-part of application Ser. No. 668,202, June 26, 1957, which is a continuation-in-part of applications Ser. No. 163,381, Dec. 19, 1961, Ser. No. 482,027, Aug. 16, 1965, and Ser. No. 482,032, Aug. 16, 1965. This application Jan. 20, 1967, Ser. No. 610,597
Int. Cl. F28d 21/00
U.S. Cl. 165—1                         14 Claims

ABSTRACT OF THE DISCLOSURE

A process for collecting heat from, and radiating heat to, the sky using insulation moved from a first to a second enclosure or portion of an enclosure. A body of liquid is confined in a horizontal plane and open to the zenith sky. A movable thermal barrier is moved over the liquid in one situation and over another liquid or area during a second condition.

---

This application is a continuation-in-part of my prior applications S.N. 668,202 filed June 26, 1957 now abandoned, and S.N. 163,381 filed Dec. 19, 1961 now abandoned, and co-pending S.N. 482,027 has now issued as Patent 3,299,589 filed Aug. 16, 1965, and co-pending S.N. 482,032 filed Aug. 16, 1965 has now issued as Patent 3,314,862.

This invention relates to a process and apparatus for modulating the temperature within enclosures. More particularly this invention relates to a simple manual or automatic manipulation of a thermal valve means to control the temperature within the enclosure as a whole or the temperature of various individual components or contents of the enclosure to suit the objectives for which the enclosure is intended.

In one embodiment, this novel thermal valve means is incorporated into a building and is operated to maintain the internal temperature as closely as possible to the most comfortable of the daily external temperatures.

In another embodiment, the thermal valve means forms part of a greenhouse and may simultaneously modulate temperatures in an adjacent building or room intended for storage of vegetables.

A similar thermal valve means may be incorporated into a solar still, as disclosed in a co-pending application, wherein it materially influences the distillation of a distilland. Moreover, the thermal valve means may influence evaporation of water from wet materials such as grain and lumber confined within an enclosure designed as a solar drier of which this thermal valve means is a part. Said thermal valve means may be adapted to solar water heaters so as to maintain desirable temperatures therein and it may be used for the cooling and the conservation of food or for the control of processes within enclosures. It is irrelevant in what form of enclosure, or for what purpose, the temperature modulation is achieved by means of my invention.

Before proceeding with descriptions of embodiments of the invention, attention is directed to certain fundamental propositions which will facilitate an understanding of the detailed description hereinafter made.

It has been historic and current practice to build structures from components such as walls, ceilings, roofs and floors which remain permanently fixed in their positional relationship to one another. Thermal comfort within such structures has heretofore been maintained either by a combination of structural design with mechanical energy consuming devices such as fans, heaters and air conditioners or through structural design alone. In hot and dry areas, thermal comfort is obtained with walls 18 or more inches thick to maintain within the structure a temperature approaching the average of the external daily variation. Walls of this type are costly and the average temperature obtained in this manner is not always as comfortable as the more comfortable of the two extremes. It often would be advantageous to maintain internal temperatures near or below the external night temperature in summer and near or above the external day temperature in winter. Hitherto, structural materials used alone have not attained these objectives.

Fireplaces, heaters and air conditioners, and fans may compensate for deficiencies of structural design but are costly in initial investment, in continuing fuel or power requirements and in maintenance. They cannot be afforded by many families in the lower income levels nor can they be used economically where fuel and electric power are not available as in deserts, on mountain tops or in remote areas. In vacation homes such devices may be subject to theft.

Many low density insulation materials have been applied to building structures or other enclosures to obviate the use of massive construction or to reduce the fuel and power consumption of temperature modulating devices. This insulation is fixed in a permanent relation to a structural component such as wall or roof. I have found that there is a disadvantage in having insulation affixed to said components and that a movable thermal barrier of said insulation can be positioned alternately during the day in different locations so as to be useful in relation to components or portions requiring insulation during a portion of the day but which should not be influenced by said insulation during another portion of the day. When this movable thermal barrier is combined with structural portions or components of proper heat storage and heat transfer characteristics, and when these portions or components are oriented properly with respect to the seasonal path of the sun, and when the movable thermal barrier is positioned in concordance with the daily path of the sun, a unique effect is had upon temperature within the enclosure.

In my invention it is usually characteristic that movement of the thermal barrier causes it to be importantly useful in various positionings during portions of the day which are unlike in solar radiation or temperature. The thermal barrier may even act in different capacities during such unlike portions of the day or it may act in the same manner but with relation to different portions or components of the enclosure and it generally serves a beneficial function in a thermal process in each of its possible positionings.

This invention is broadly related to the collection of solar energy, for its storage and for control over its dissipation. While disclosed with particular reference to maintaining temperatures suitable to life or favorable for the preservation of organic materials and with reference to production of potable water from saline or brackish water, to heating or cooling a water supply, or to the drying of grain or lumber, because of the particular utility it is expressly understood that the invention is not restricted thereto.

The primary object of this invention is to provide an improved process for controlling the collection and loss of solar energy characterized by low-cost installation, operation and maintenance.

Another object is to provide an improved process and device for controlling either the collection of solar heat or the loss of heat so as to maintain the interior of an enclosure or the components or portions of the enclosure or of materials or objects within the enclosure nearer the most desirable part of the natural diurnal temperature cycle.

It is an object of this invention to provide a measure of heat control within an enclosure by moving structural components into different positional relationships to other components wherein the components are selectively composed of materials having varying heat storage characteristics and the movement is selectively timed in relation to external temperatures.

Moreover, it is an object of my invention to provide novel solar stills, enclosure walls, and food coolers which may be used in conjunction with a liquid whose temperature is controlled with my thermal valve means to enhance the results obtained therewith, although these novel devices are likewise disclosed as being of value when used independent of said thermal valve means.

It is a further object to provide improved means for heating a water supply for domestic or other use.

An additional object of this invention is to control the temperature of thermally sensitive objects and processes such as evaporation, distillation, heat storage or transfer, and all such processes as are influenced by thermal change within an enclosure. Other objects and advantages of the present invention will become more apparent after reading the following descriptions taken in conjuntcion with the drawings.

The invention is capable of receiving a variety of mechanical expressions illustrated on the accompanying drawings, but it is to be expressly understood that the drawings are for illustration only and are not to be construed as defining the limits of the invention, reference being had to the appended claims for that purpose. For clarity, the description relating to a building structure as illustrated in FIGURES 1 to 12 inclusive will, for the most part, be separated from the description relating to the control of temperatures or processes involving water as a thermal storage and thermal transfer medium although it will be clear that the principles involved and the nature of this invention may be the same in the following discussion of FIGURES 13-23.

FIGURE 2 is a sectional and partially cut-away view of a knife-edge runner means for moving a thermal barrier;

FIGURE 3 is a sectional view of FIGURE 2 taken along lines 3—3 of FIGURE 2;

FIGURE 4 is a diagrammatic sectional representation of a means for moving a plurality of movable thermal barriers;

FIGURE 5 is a fragmentary sectional and perspective view of a grooved trackway suitable for use with a knife-edge runer as a means for moving the movable thermal barrier;

FIGURE 6 is a perspective view of a dual knife-edge runner of flexible material suitable, in combination with the grooved trackway of FIGURE 5, for moving the thermal barrier, when connected thereto, and also serving as a hinge for separate panels constituting said thermal barrier;

FIGURE 9 is a diagrammatic sectional view of an embodiment in which a portion of the wall of an enclosure comprises a liquifiable material 147;

FIGURE 10 is a perspective sectional representation of an embodiment in which the movable thermal barrier is moved externally from an area substantially covering a first compartment to an area substantially covering a second compartment;

FIGURE 11 is a fragmentary diagrammatic sectional view of a further embodiment of the invention in which the movable insulation 403 is alternately positioned near the high thermal capacity wall or positioned substantially parallel to the floor at a considerable distance from the roof portion;

FIGURE 12 is a fragmentary diagrammatic sectional view of an embodiment in which the movable thermal barrier 503 is positioned alternately exterior and interior of an enclosure;

FIGURE 14 is a fragmentary sectional view diagrammatic of wall framing members confining a fluid within flexible containers between the framing members;

FIGURE 15 is a diagrammatic fragmentary sectional side view of a wall confining a fluid within a flexible container;

FIGURE 16 is a diagrammatic perspective view of a length of tubing partially sealed into interconnecting segments suitable for confining a fluid in spaces between wall members;

FIGURE 17 is a diagrammatic side view of a length of tubing confining a fluid and being placed between wall members;

FIGURE 18 is a diagrammatic sectional view of a wall showing framing and two flexible containers confining a fluid, the innermost container shaped as illustrated in FIGURE 17;

FIGURE 19 is a diagrammatic cross section of a hollow structural block with one cavity containing two portions of flexible tubing for confining a fluid;

FIGURE 20 is a diagrammatic fragmentary partially cutaway perspective view of a wall wherein cavities of hollow blocks are filled by a fluid within a flexible length of tubing;

A. THERMAL MODULATION IN A BUILDING STRUCTURE

The following description of the invention applies more broadly than to a building structure but is related thereto as one embodiment of an enclosure. Within the meaning of this invention, an enclosure is any structure substantially or usually surrounded by one or more structural elements which confine space or substances in a manner affecting thermal exchange between the confined space or substance and the environment surrounding said enclosure. In the form in which the enclosure is a building structure, this invention usually involves three separate and distinct building elements or components with different heat transfer characteristics. These three elements properly incorporated into the design of a building form a thermal valve means which may be manipulated manually or automatically in relation to the time of day so as to maintain the temperature within the building as close as possible to the more desirable of the daily extremes, to comfort zone temperatures, or to any desired temperature. These three building elements or components are as follows:

(I) *The high thermal capacity wall*

Figure 1:
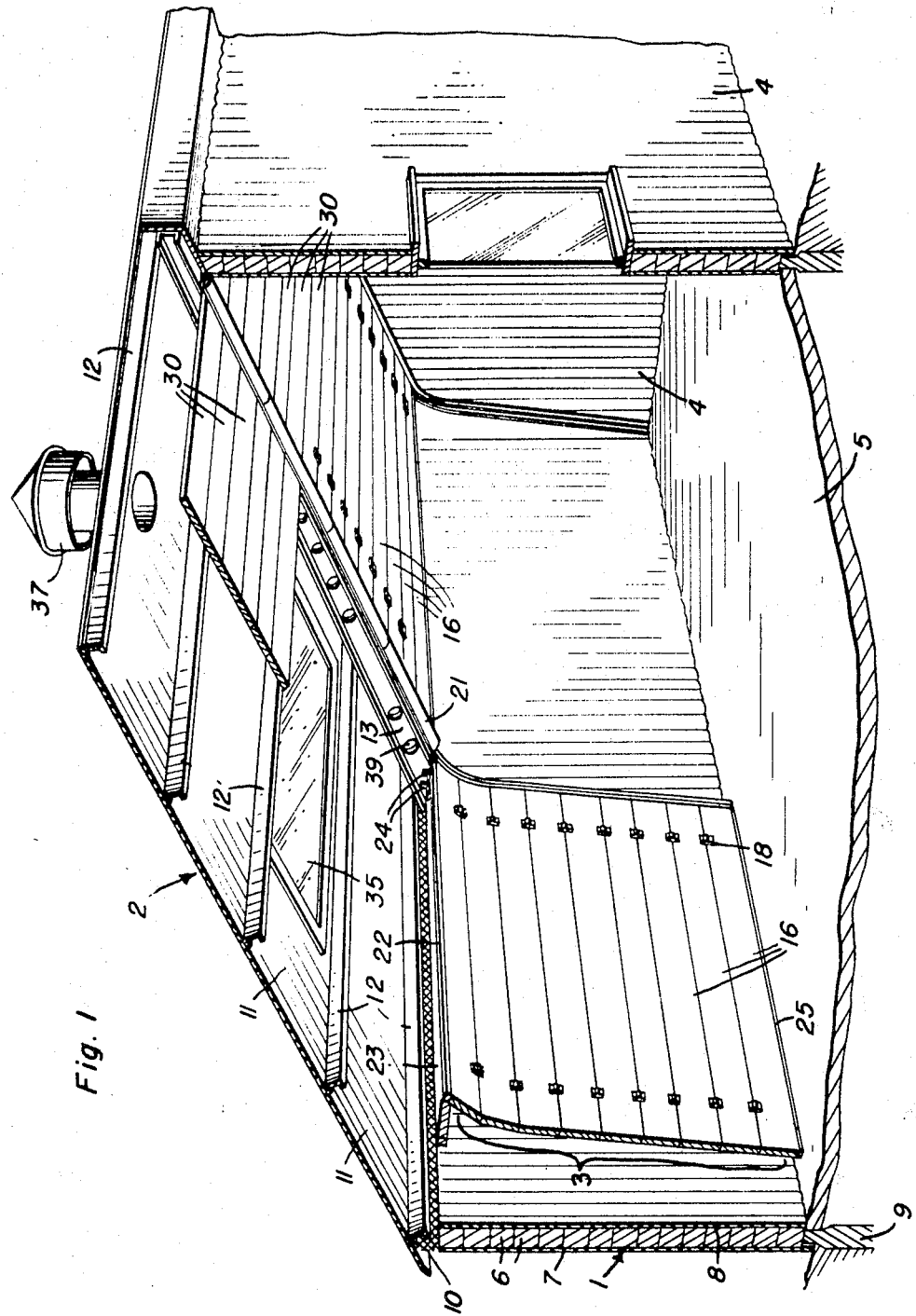
FIGURE 1 is a front cut-away perspective view of a building structure in which the novel process is employed.

In the embodiment of this invention shown in FIGURE 1, a building structure has at least one substantially vertical wall 1 composed primarily of high thermal capacity material. Said wall should have moderate thermal transfer characteristics and should preferably be oriented toward the equator. Wall 1 may consist of brick, stone, adobe, concrete, or similar materials or mixtures thereof. The interior and exterior surfaces of said wall may be finished with plaster, stucco, paint, or sheathed with metal, plastic, plywood, fiberboard or such materials as do not substantially alter the thermal character of said wall. One might also use a wall consisting of two opposed metal panels, as shown in FIGURE 9, confining a fluid 147 of high thermal capacity such as water or heat storage chemicals of the type of sodium sulfate decahydrate, sodium thiosulfate pentahydrate, etc., in their molten state.

Preferably, high thermal capacity wall 1 should be of such thickness as will provide about a twelve-hour heat lag in attaining maximum or minimum temperature by heat transfer from one face to another. Brick, stone, concrete or earth walls approximately thirteen inches thick have been found suitable, although a thickness range of as wide as three and twenty inches may be satisfactory under varied conditions and in diverse localities.

(II) The roof

The building structure of FIGURE 1 has a roof 2 constructed of a material having little resistance to heat transfer and little thermal storage. Thin sheets of metal, glass, asbestos-cement, plastic or similar material may be used. The roof 2 preferably should be low with relationship to the floor to minimize the cubic volume of the room and should slope with substantial equatorial exposure. This type of roof has heretofore been considered undesirable for structures because under former circumstances it produced uncomfortably warm internal temperatures during summertime days and uncomfortably cool temperatures during winter nights.

(III) Movable thermal barrier

The building structure of FIGURE 1 has what can aptly be referred to as a thermal valve 3 or otherwise referred to as a movable thermal barrier 3. Said barrier is preferably composed of low density sheets, panels or blocks of insulation having low heat storage and low thermal transfer characteristics. The insulation may be of the rigid type, such as relatively thick sheets of vegetable fiber, cork, foamed glass or expanded polystyrene. The insulation also may be of the semi-rigid type such as batts of wood fiber, mineral wool, fibrous glass, or the foamed products of rubber, polyurethane or other plastic or resin materials.

Movable thermal barrier 3 likewise may be formed from non-rigid materials such as mineral wool, fibrous glass or wood fiber loose-fill insulations held in flexible cloth, paper or other containers, or from aluminum foil or other reflective insulation alone or in combination with other insulators. The combination of rigid and non-rigid materials, some or all of which may be transparent or translucent, is also contemplated.

The above-described material in the movable thermal barrier 3 contrasts with the high thermal capacity wall 1 in having a much lower thermal storage capacity and lower heat transfer characteristics and it contrasts with roof 2 in having a much lower rate of heat transfer. These distinguishing properties of the movable thermal barrier allow it to function effectively as a thermal valve.

In FIGURE 1, the movable thermal barrier is mounted inside the building structure and can be alternatively positioned closely adjacent either the inside of high thermal storage wall 1, which has a partially controlled thermal flow, or of the roof 2, which has an essentially uncontrolled thermal flow. When so mounted the barrier 3 can control the flow of heat into and out of the building structure.

(IV) Other elements of the structure

As shown in FIGURE 1, the other three walls of the building structure may be constructed of the same high thermal capacity material as wall 1 or of any other suitable material. It should be realized that the temperature cannot be controlled within the same limits if all walls are not of high thermal capacity. The structure preferably has a poured concrete floor to add its high heat storage although wooden or other flooring can be used. Other elements of the structure should have high heat storage abilities when feasible.

The above description of the various elements of my invention will be clearer after reading the following description taken in conjunction with the drawings:

FIGURE 1 is a cut-away perspective view of a building forming one embodiment of this invention. This structure comprises a substantially vertical high thermal capacity wall 1 constructed of a plurality of stacked bricks or concrete blocks 6. A roof 2 has its lower edge supported by the upper portion of wall 1 while the opposite end of roof 2 slopes upwardly and away from the top of said wall. A movable thermal barrier 3 is disposed within the building structure. Two other walls 4 are shown, which together with a fourth wall (not shown) and a floor 5 complete the enclosure except for doors (not shown) and windows (partially shown).

As shown, the high density wall 1 has outer and inner faces covered by sheath material 7 and 8 which preferably consists of plaster, stucco, tile, or of rather thin elongated sheets of metallic or plastic material joined to the high density wall by bolts, screws, nails, adhesives, etc. The plurality of stacked blocks 6 is supported on a suitable foundation or footing 9.

Near the top of the high thermal capacity wall 1 transverse support means in the form of purlins 12 bearing on I-beam frame 13 can be provided for the roof 2. In FIGURE 1, ventilation eave 10 permits ventilation between the inside and outside of the building. A similar ventilation strip near the upper edge of roof 2 may be used in lieu of roof ventilator 37.

In FIGURE 1, roof 2 consists of a plurality of overlapping metal sheets 11 supported by and fastened to transverse roof members 12. The roof supporting members 12 are supported by I-shaped beams 13. Beams 13 are firmly anchored at their lower extremities in a suitable foundation 9, preferably of concrete. The lower edge of I-beam 13 serves as a base or anchoring point for one or more trackways within which rollers attached to any desired portion of thermal barrier 3 are adapted to travel. If desired, lighting means 21 may be arranged below I-shaped beam 13.

In FIGURE 1, movable thermal barrier 3 is a plurality of elongated and essentially rigid strips of lightweight insulation material or frames of supported non-rigid insulation material 16. The individual insulating panels 16 may be joined by piano-type hinges 18 or panels 16 may be made to adhere to a continuous flexible backing of fabric or metallic material, as for instance sheet aluminum, by use of an adhesive.

The upper horizontal edge of the upper insulation panel 16 preferably has a flexible sealing element 22 to provide, in conjunction with stationary wall seal 23, an effective seal when movable thermal barrier 3 is in its lower position so that air between thermal barrier 3 and wall 1 cannot move into the main portion of the building by leakage or convection. Wall seal 23 is held in position by one or more brackets 24 attached to I-beam 13 or to the walls. A similar sealing means 25 is shown on the lower horizontal edge of the lowest panel member 16. When movable thermal barrier 3 is in its uppermost position essentially parallel to the roof 2, the seal 25 in conjunction with wall seal 23 restricts movement of air between thermal barrier 3 and roof 2 so that this air does not pass into the main portion of the building.

I-beam 13, of FIGURE 1, can be considered as dividing the building into right-hand and left-hand portions. Movable thermal barrier 3 to the left of beam 13 is in its lowermost position. By examining the area to the left of beam 13 near the point where the beam joins the upper portion of roof 2, it will be seen that a number of permanently positioned insulating panels 30 extend across the building in a generally (but not necessarily) parallel relationship to the upper part of roof 2. The fixed panels 30 form an extension of the thermal barrier between the roof and the interior of the building when the area of movable thermal barrier 3 is not great enough to adequately cover the entire roof area. The manner in which panel 30 and panel 16 cooperate to cover the entire roof area is best seen by observing the area to the right of beam 13. If the roof area is the same as the area of the high thermal capacity wall, stationary panels 30 are not needed.

Panels 30 are shown in FIGURE 1 to be fixed, but they may be movable toward the wall opposite that indicated as wall 1 or panels 30 may be hinged independently but operated as a unit to change from a position approximately parallel to the roof (or floor) to a position approximately parallel to the walls, thus exposing the under portion of roof 2 in the area of panels 30.

FIGURE 1 shows that roof 2 may be constructed of more than one material. The roof may contain, in addition to the metallic sheets, one or more area of glass or transparent or translucent materials such as plastics (e.g. skylights) 35 which permit sunshine to enter the building when movable thermal barrier 3 is in its lowermost position. Also the roof may contain one or more ventilating cowls 37. Alternatively, a ventilation strip of the type of 10 at the eaves may be located at the higher edge of the roof or louvres may be provided in the end walls between roof 2 and the position of fixed panels 30 or thermal barrier 3 in its uppermost position. I-shaped beam 13 contains a number of circular holes 39 which permit cross circulation of air when the movable thermal barriers are in their uppermost positions.

The movable thermal barrier 3 may be either manually or automatically raised and lowered and may be maintained in any raised position by means of counterweights or by inserting a pin, lug or catch into a hole in a portion of the trackway so as to obstruct the downward movement of the roller within the trackway. Said thermal barrier 3 may be raised by either lifting the lowermost panel of the thermal barrier or by pulling a cord, wire or chain attached to the uppermost panel of the thermal barrier, said cord or wire preferably passing over appropriate pulley arrangements located near the top of the roof. Counterweights or spring arrangements and lockable sprockets or other fastening means may be suitably employed. Also, one might employ an entirely different means for moving the thermal barrier from one position to another. For example, the knife-edge runner of FIGURES 2–6 may be employed as described later.

In summertime, the method of using the thermal valve means to obtain internal temperature modulation involves positioning movable thermal barrier 3 near roof 2 during the daytime and adjacent high thermal capacity wall 1 during the nighttime. In this manner, solar heat which penetrates the roof during the daytime is blocked from entering the room by the movable thermal barrier. Also, during the day, the sun's heat will start penetrating high thermal capacity wall 1 but owing to the time lag provided in the wall, the peak heat will not reach the interior surface of the wall until after sunset. At this time the movable barrier is lowered to prevent this heat from passing into the room at night. Simultaneously, lowering the thermal barrier 3 from the overhead position adjacent the roof permits heat radiation from the room through the roof to the cold night sky. Thus the heat of day is excluded from the room while the interior of the room is allowed to cool to night temperatures through internal convection and without the necessity of opening doors, ventilators and windows as is usually practiced with only partial effectiveness if house design, orientation or external wind velocity are not optimum.

The heat stored in the high thermal capacity wall during the daytime is blocked by the presence of the movable thermal barrier at night and dissipates externally to the night sky by radiation. During daytime the interior surface of this wall is cool, exposed and able to absorb from the room a good portion of the infiltrated heat since the movable thermal barrier then is positioned near the roof.

During wintertime, the method of obtaining optimum thermal modulation by means of the movable thermal barrier consists of reversing the relative position of the movable thermal barrier as compared to its position in the summer. Thus during the day the movable thermal barrier would be positioned against the high thermal capacity wall 1 so that heat in the room is not absorbed into this wall which has cooled during the night. Simultaneously, during the day the roof 2 radiates solar heat into the room raising the temperature to or nearer the optimum comfort range. At night the movable thermal barrier is raised to prevent heat loss from the room through the roof and simultaneously the stored heat acting with a twelve-hour heat lag through the high thermal capacity wall enters the room maintaining comfortably warm temperatures throughout the night despite heat loss through leakage at the doors, ventilators and windows.

Figure 7:
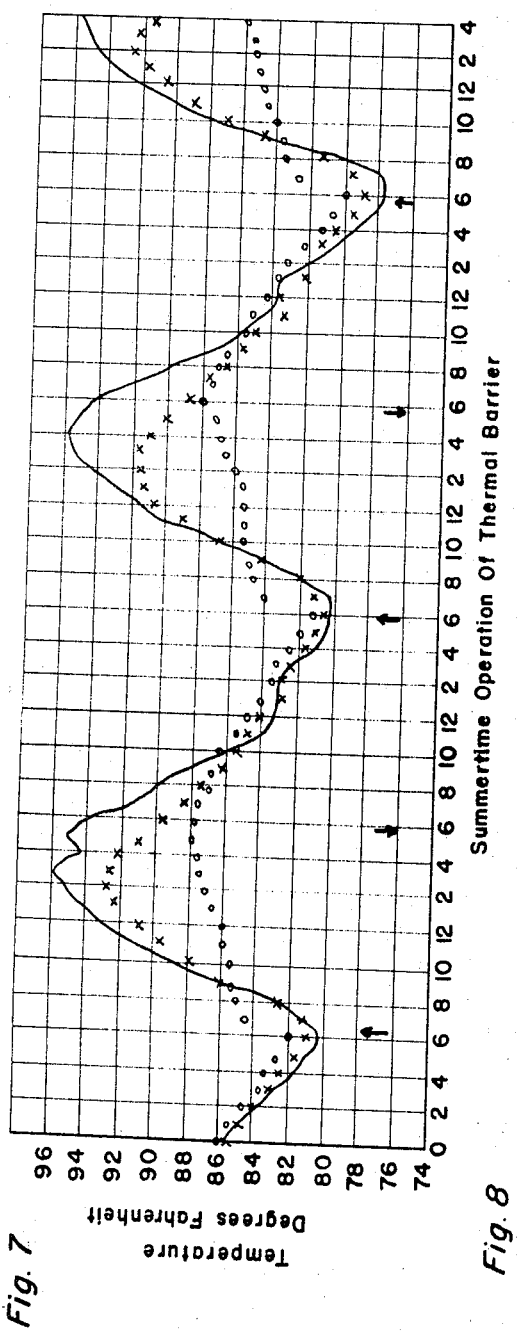
FIGURES 7 and 8 are temperature variation charts showing effects typically obtained in enclosures fitted with movable insulation.
Figure 8:
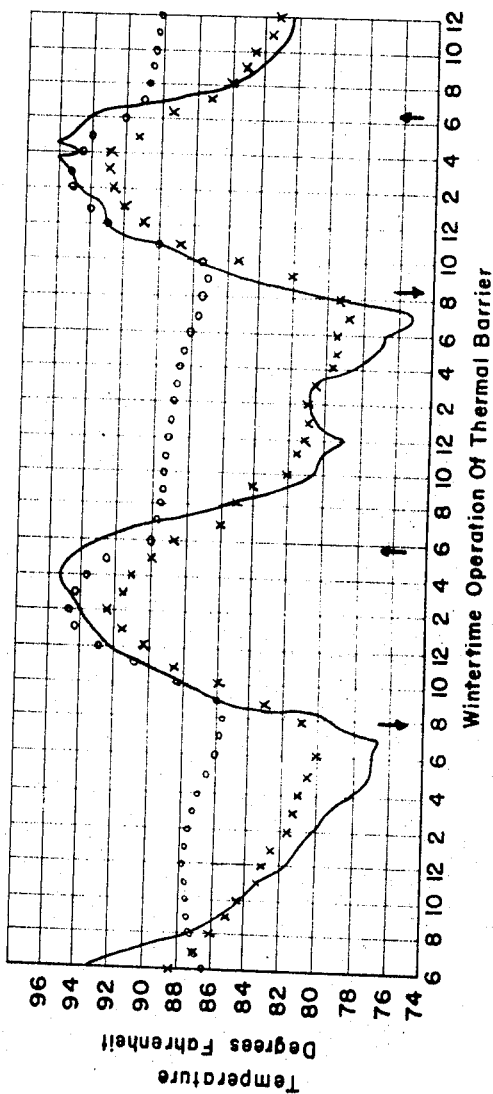

FIGURES 7 and 8 illustrate the great degree of temperature control achieved by employing the novel thermal valve means of this invention in conjunction with a high thermal capacity wall and other elements of the building structure. FIGURE 7 presents temperature variations achieved during summertime operation of the movable thermal barrier while FIGURE 8 graphically shows the temperature control achieved during wintertime operation of the movable thermal barrier. The solid lines in these graphs represent the official weather bureau shade temperature. The curve defined by $x$'s represents the observed temperature in an adjacent room not provided with a movable thermal barrier. The curves defined by a series of small circles represent the observed temperature in the room provided with a movable thermal barrier.

FIGURE 7 shows that the weather bureau shade temperature, the temperature in an adjacent room and the temperature in the room provided with a movable thermal barrier are all approximately the same at about 6 a.m. Between about 6 a.m. and 8 a.m. the temperature, in the room provided with a movable thermal barrier operated under the conditions indicated, rises somewhat above the other two temperatures, but at about 8 a.m. the temperature in the room provided with the movable thermal barrier begins to level off and does not exceed about 88° while the other two temperatures continuously increase to a maximum of between 92° and 96° at about 2 to 4 p.m. as a result of the uncontrolled effects of the sun. After about 4 p.m. the weather bureau temperature and the temperature in the adjacent room begin to drop and at about 10 p.m. the three temperatures approximate each other again and drop together until about 6 a.m. the next day. Thus, proper placement of the movable thermal barrier can lower the peak interior temperature during the day considerably below the temperature which would exist in the room if there were no movable thermal barrier. The peak with the thermal barrier is approximately one-half that of the outdoor temperature in this example where a 16 to 18 degree diurnal variations was recorded. In cases where a 40 degree variation is common, the benefit of proportionately reducing the peak temperature is of much greater value.

FIGURE 8 illustrates wintertime operation in accordance with this invention. The movable thermal barrier is in a raised position between the hours of about 6 p.m. and 8 a.m. While raised it prevents loss of heat from the interior of the building through the roof and permits heat stored in the wall 1 to flow into the room. Therefore between the hours of 6 p.m. and about 8 a.m. the temperature within a room provided with a thermal barrier is much higher than either the weather bureau shade temperature or the temperature in an adjacent room not provided with a movable thermal barrier. Between the hours of about 8 a.m. and 6 p.m. the movable thermal barrier is in its lowered position to permit solar heat to pass into the building through the roof 2 while at the same time it prevents loss of this heat into the night-cooled wall 1. By using a movable thermal barrier and a high thermal capacity wall one is thereby able to maintain the temperature within a building during the wintertime at a level considerably above that which would otherwise be possible if no thermal barrier means were used. The results shown in FIGURES 7 and 8 were obtained in successive weeks in September when day and night temperature differential was minimal in the area. A much more pronounced effect would be shown when the winter range is 30° to 70° F. and the summer range is 70° to 110° F.

Because the material of the movable thermal barrier and the means for moving it are important aspects of this invention, it is desirable to describe another thermal barrier means which constitutes an alternate to the rigid panels mounted with rollers and trackway. As shown in FIGURES 2, 3 and 10, movable thermal barrier 303 may consist of flexible polyurethane 334 fastened by adhesives to a more weather resistant, flexible backing material 319 and having a plurality of horizontal stiffening I-shaped members 332 attached to said backing strip 319 which transfer the weight of said thermal barrier 303 onto a knife-edge runner 327 a portion of which 336 engages said member 332 while the knife-edge portion is mounted to engage in a grooved trackway 228 suitably mounted on the I-section arched rigid frame 213 of FIGURE 10 which is a part of the enclosure of this invention.

Stiffening members 332, of FIGURES 2 and 3, may be made of aluminum; knife-edge runner 327 may be made of a suitable plastic such as Delrin; grooved trackway 228 may be formed of another plastic such as nylon resin fastened by an adhesive to arched frame 213 which may be made of steel, aluminum, wood, or other appropriate material. FIGURE 2 shows grooved trackway 228 formed with projections 229 partially surrounded by lip member 331 formed as a part of knife-edge runner 327. An enlarged view of continuous grooved trackway 228 with projections 229 is shown in FIGURE 5.

FIGURE 6 shows a dual knife-edge runner 27 and 27a having a shape substantially as in FIGURES 2 and 3 except for the portion to be attached to the movable thermal barrier. In FIGURE 6, side projections 52 and 52a provide a wide base for fastening knife-edge runners 27 and 27a to panels of insulation, such as panels 16 of FIGURE 1, at points suitably oriented to transfer their weight onto structural member 13. The two knife-edge runners 27 and 27a of FIGURE 6 are interconnected by a thin flexible section 38, of the same plastic from which said runners are formed, which can serve as a hinge when 27 and 27a are fastened to separate abutting panels of FIGURE 1. The lip projections 31 and 31a of FIGURE 6 are designed to engage projections 229 of the trackway shown in FIGURE 5 so that knife-edge runners 27 and 27a do not become disengaged from said trackway when the latter is mounted onto a vertical portion of a frame member such as 213 of FIGURE 2.

It is apparent that the knife-edge runner of FIGURE 6 could be extended from the dual form illustrated to include any number of knife-edge runners of the type of 27 separated by one less flexible hinge of the type of 38. It is equally obvious that parallel rows of these knife-edge runners could be made with projections 52a shared in common by said parallel rows and thus form a single unit comprising a plurality of rows of individual knife-edge runners of the type of 27 and 27a.

The advantages to this invention of the use of knife-edge runners and of movable thermal barriers of the types described above are the following: The continuous insulation eliminates forming and mounting a plurality of panels and hinges such as 16 and 18 of FIGURE 1. Likewise, the cost, installation and maintenance expense of the more elaborate trackway and roller moving means are eliminated. Additionally, the movable thermal barrier may now be formed so that the flexible polyurethane 334 constitutes its own sealing means thereby eliminating sealing elements 22 and 25 used in FIGURE 1.

It is obvious that the knife-edge runners will be variously mounted in different embodiments of this invention. FIGURE 4 shows details for mounting two thermal barrier means 103 and 103a on a common frame element 113 of the enclosure made by roof 102 supported by purlin 112 fastened to structural frame element 113 to form an enclosure of the type of FIGURE 1. In FIGURE 4, panels 116 bear on knife-edge runners 127 which transfer the load onto grooved trackway 128 suported by said structural member 113. The movable thermal barrier 303 of FIGURES 2 and 3 has been previously described and is supported by structural member 213 so as to be outside of the enclosure made in part by roof 202 composed of transparent material such as glass or suitable plastic affixed to said structural member 213 by bolts 250 which effect a sealing pressure on the plastic or fibrous roof-framing material 248. The exterior mounting of the movable thermal barrier illustrated in FIGURES 2 and 3 can suitably be used for an embodiment of this invention shown in FIGURE 10 which will be described in greater detail.

If the thermal barrier is made in a weather-resistant manner, it may be positioned outside of the high thermal capacity wall and the roof of a building and may be of such size as to cover both simultaneously. FIGURE 10 illustrates this embodiment of the invention in the form of a greenhouse to the left for growing plants and a cold-storage portion to the right for the storage of seeds or bulbs and for retarding the growth of plants kept therein until periods of greater demand.

In this embodiment, thermal barrier 303 is shifted from an equatorially oriented compartment over a ridge at position marked C to the polar side of the biulding. During winter days the equatorial compartment is heated through roof 202 which comprises high heat transfer materials of transparent types also forming a substantial portion of the equatorial wall. During this period 205 and the other walls 204 in addition to the high heat storage wall 201 store heat and all are high heat storage portions of the enclosure and may be considered in common as the high heat storage component of this embodiment. At night, the thermal barrier is moved from the polar side of the building to the equatorial compartment and is disposed externally to insulate both its wall and roof. In addition to preventing heat loss through the equatorially-oriented roof 202 during the nighttime, all of the solar heat stored in wall 201 is directed inwardly at night. In contrast, the earlier embodiment with internal insulation radiates stored heat both inwardly into the room and outwardly to the night sky during the nighttime.

By dividing the building into a plurality of compartments illustrated in FIGURE 10, the novel features of this invention simultaneously produce opposite thermal effects in the compartments. In winter the temperature within the equatorially exposed room is raised during the day and held at an elevated temperature during the night, while the polar-oriented room is prevented by the thermal barrier from increasing greatly in temperature during daytime and is cooled to the sky at night. This dual thermal control provides continuous warmth in the equatorially exposed room for living things and prevents damage therein to materials or goods deleteriously affected by low temperatures while it provides low temperatures corresponding to cold storage in the polar oriented room. If desired, in summer the dual thermal control may be used to lower the temperature in the equatorially oriented room while maintaining an elevated temperature in the polar oriented room. Elevated temperatures in the building structure may be desirable for the drying seeds, fruits, and the like, for forcing faster growth of plants, for the fermentation of fodder in a farm structure or for other purposes.

The movable thermal barrier illustrates in FIGURE 10 may also create desirable temperatures within the compartments by being positioned only a fraction of the day one one or the other of the sides of the building or by being positioned part of the day to insulate only a portion of the roof or wall portions while leaving another portion on the same side unaffected by insulation. This is clear from FIGURE 10 where the length of movable thermal barrier 303 equals the distance between points D–F and leaves an area of roof 302 exposed between limiting points C and D. If, however, the C–D area of said roof should be covered by the thermal barrier, a corresponding section of high heat storage wall 301 between points E and F will be exposed. Similarly, if D–F equals C–B on the structure and the insulation covers roof area 202 between points C–B, the wall portion 201 between points B–A will be exposed, but if the same thermal barrier is moved down to A, a portion of the roof 202 near the ridge at C will be exposed. In this manner it is possible to obtain controlled temperatures ranging substantially from the maximum to the minimum of the daily diurnal variation.

In the embodiment of FIGURE 10, the common wall of the two compartments includes an insulating material 226 to reduce thermal flow between the compartments. The roof 302, walls 304, floor 305 and wall 301 all become the high heat storage portion of this compartment in which the movable thermal barrier is positioned by means of a knife-edge runner assembly 328. Said assembly 328 comprises a knife-edge runner fastened to said thermal barrier by means illustrated in FIGURES 2 and 3 and a trackway such as that shown in FIGURE 5 which in FIGURE 10 is shown as fastened by suitable means directly to the concrete roof and wall portions 302 and 301 respectively. The trackway of knife-edge assembly 328 continues over the ridge C and onto the structural frame member 213 where it is indicated as 228 and a corresponding trackway at the end of the structure is indicated as 228a. The roof framing material 248 of roof 202 may be made of plastic, wood or metal and the transparent portions 249 of the roof may be of plastic or it may be of glass.

An alternative arrangement (not shown) with rooms of similar size and shape disposed side by side with identical orientation, permits insulation covering both the sides and the roof of a first room to be laterally shifted on rollers bearing on a foundation common to both rooms so that the insulation covers, during a different portion of the day, the second room.

In the embodiment illustrated in FIGURE 11, showing a portion of the upper part of a building, this invention positions thermal barrier 403 parallel to the floor (not shown) during part of the day and at a considerable angle to and distance from a roof 402 supported by framing member 413. Trackway 414 on which the movable thermal barrier is mounted is parallel to the wall 401 until it reaches a point near roof 402 where it becomes parallel to the floor (not shown) and is fastened at 442 to the other wall 404. The space between roof 402 and thermal barrier 403 of FIGURE 11 tends to build up high temperatures during a summer day. While high temperatures are useful in greenhouses, grain or lumber driers, hot water heaters and solar stills as will be described in section B, the effect is not desirable in houses. Consequently, it is advisable to have louvres 441 or cowls (shown in FIGURE 1) to reduce heat build-up in this enclosed area. The data of FIGURES 7 and 8 were obtained in a house built according to this embodiment of FIGURE 11.

In another embodiment shown in FIGURE 12, insulation 503 is movable on trackway 514 which is continuous over exterior wall 501 and roof 502, passes through aperture 545 in said roof and continues along the interior surface of said roof and said wall to permit thermal barrier 503 to be positioned inside of or outside of the enclosure formed substantially by said roof and said wall. A ridge member 543 and a suitable hinged sealing device 544 is supported adjacent aperture 545 by support 559 mounted at the upper ends of wall 504. The insulation may be positioned totally within the structure during the day in which case the exposed wall 501 and roof 502 store heat which radiates into the room when the movable thermal barrier is put into a nighttime position exterior to said roof and said wall. Instead of thus warming this portion of the enclosure, it can be cooled by the same thermal barrier means by merely reversing the daytime and nighttime positions of said thermal barrier.

In an additional embodiment of the invention which can be made sufficiently clear to those versed in the art by FIGURE 12, one can arrange a switching device (not shown) but similar to those used in railroad tracks, above wall 504 so as to interconnect the trackways both internal and external on the portion of the structure to the right of wall 504 with trackways 514a shown broken attached to roof 502a to the left of wall 504. By means of such switching mechanism, it is possible to cause movable thermal barrier 503 to pass through aperture 545 to a position either on the interior or on the exterior side of roof 502a and of other possible components of a compartment to the left of wall 504, such as a high heat capacity wall (not shown), and thereby provide another means for controlling the temperatures in the two compartments partially indicated to the left and to the right of wall 504 of FIGURE 12.

In another embodiment, not shown, the aperture through which the movable insulation passes is located at the eaves by removing eave ventilator 10 shown in FIGURE 1 and the insulation is caused to take various positional relationships with wall 1 and roof 2. With suitable trackways and apertures at both the eaves and the ridge, the number of positionings increases as does the means for temperature control within the enclosure or within different compartments of the enclosure.

In the preceding embodiments of my invention:

(a) The high heat capacity component of my enclosure may be: a solid wall (1 of FIGURE 1); a wall containing a liquid (101 of FIGURE 9); a wall of both high and low heat storage components (201 with a portion of 202 of FIGURE 10); a wall of high or low heat storage which may be a continuation of the roof materials (202 and 302 of FIGURE 10); or other high heat capacity components of the enclosure and contents thereof;

(b) The thermal barrier may be moved: from wall to roof and back (FIGURE 1); from one compartment to another (FIGURE 10); internally in one compartment (FIGURE 1); externally and over a plurality of compartments (FIGURE 10); alternately from a first position either internal or external to a second position internal or external on the same or on a different compartment (FIGURE 12); and (c) The roof or cover of my enclosure may be: of thin material of high heat transfer and low heat storage (FIGURE 1); of thick material of moderate heat transfer and high heat storage (FIGURE 12); or of high heat storage materials of varying thickness (302 of FIGURE 10).

It is also evident that while the movable thermal barrier is preferably of low density with low heat capacity and low heat transfer, said barrier could be effective if made of high heat capacity and high thermal storage materials such as thick metal, concrete, confined water, and the like. Movement of such a high heat capacity thermal barrier has obvious limitations in a building structure and costs would be high, but they may be more practical for other enclosures as in my co-pending continuation-in-part application Ser. No. 482,032 dealing with solar stills.

Figure 13:
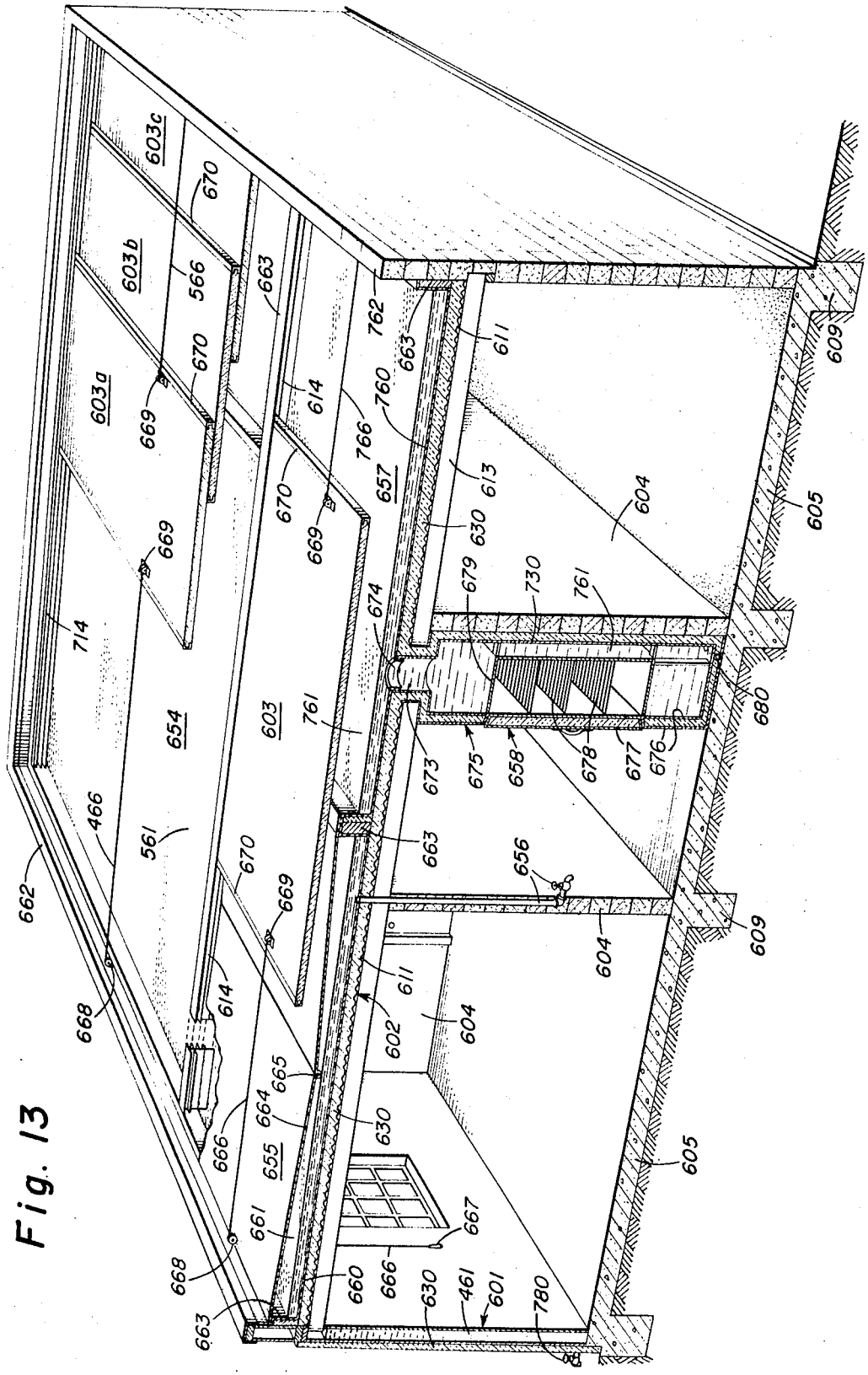
FIGURE 13 is a cut-away perspective view of a building structure, a ponded roof, a solar still, and a cold water reservoir and food cooler in which temperatures are controlled.

In the embodiment of FIGURE 13, my thermal barrier is moved in relation to water in a roof pond 654. Some novel aspects of this embodiment can best be understood after describing some processes and new devices in which my principles have been applied to solar stills and to water heaters and coolers.

B. THERMAL MODULATION OF PROCESS TEMPERATURES

The modulation of temperatures within enclosures inevitably affects thermally sensitive objects and processes within said enclosures. Temperature modulation in a house desirably affects the physiological processes of the occupants even though the enclosure may not always be intact—at times doors and windows may be open. In a greenhouse and for cold storage, this invention was applied in part A to modulate temperatures affecting processes such as growth, blooming and rotting. In all life within the enclosures of part A, thermal modulation affects the heating and evaporation of water constituting a part of that life. My invention can modulate temperatures within enclosures so as to affect processes of evaporation, distillation and drying and it can be applied to heat or cool water for household or industrial uses as will now be described.

In the left foreground portion of roof 602 shown in FIGURE 13, a solar still 655 is illustrated from which water 661 can be drained through pipe connection and faucet assembly 656. In the right foreground portion of roof 602, a water cooling basin 657 is shown which cools a food cabinet 658. Shown partially over the still 655 and partially over the cooling basin 657 is a movable thermal barrier 603 positionable over either said still or said cooling basin to control temperatures in both.

Still 655 is supported on roof 602 with the load transferred by beams 613 to walls 604 and 601. Shown serving as ceiling of the rooms and bottom of the still is a plurality of overlapping sheets 611 of metal, asbestos-cement or plastic shown corrugated. Above sheets 611 is fixed insulation 630, preferably of foamed polyurethane, covered by the still liner 660 which turns upwardly at the wooden framing members 663 which, together with another framing member not shown, form the limits of still 655. Liner 660 is preferably black, relatively thin, sheet plastic such as chlorinated polyethylene, halogenated polyvinyl or polyvinylidene composition, or of polyester. Liner 660 is fastened at its raised edges by adhesives, staples, splined recesses or pressure members (not shown) to framing members 663 to form a distilland basin to contain water 661 preferably one inch or less in depth. The water depth is controlled by an assembly (not shown) consisting of a float valve controlling a distilland inlet. The still cover 664 is shown supported over the distilland basin by framing members 663 and is fastened thereto as described for the liner 660. An elongated weighting means 665, made of plastic or corrosion resistant metal and consisting of an external spline and an internally suspended collecting trough described fully in my co-pending application Ser. No. 482,032, deflects the flexible cover downward causing condensate to converge under weighting means 665 and to be removed from the still through the collecting trough portion of said weighting means. The distilled water may then pass through a connected conduit (not shown) to a point of use.

Distillation in still 655 is best when the distilland has a high temperature in the morning. During the night, therefore, thermal barrier 603 is positioned over still 655 by pulling downward on drawcord 666 at point 667 shown inside the building. Drawcord 666 passes from point 667 through roof 602 over a pulley 668 mounted on framing member 663 and is fastened to the panel of movable insulation 603 by means 669 consisting of an eye-bolt, staple or shackle on said panel or on the framing member 670 thereof.

In the morning, thermal barrier 603 is moved from the position over still 655 by pulling on drawcord 766 fastened to the opposite end of panel 603 from drawcord 666 and passing over a pulley and through roof 602 in the manner described for drawcord 666 to a suitable point in the building. Drawcord 766 may become continuous with drawcord 666 so that a force applied in one direction moves the insulation over the still and applied in the other direction moves the thermal barrier from the position over the still. Thermal barrier 603 moves on trackway 614 by means previously described.

Solar stills of design different from that shown in FIGURE 13 may be employed in this embodiment; as, for example, a roof-type glass-covered still or an air-inflated plastic-covered still. The cover 664 is preferably plastic capable of transmitting solar radiation and wettable on the undersurface. Polyvinyl fluoride film sandblasted to improve wettability is suitable. It is also obvious that water not covered to become part of the solar still can be heated and held at a high temperature by the movable thermal barrier 603 but the temperature would not be so high as under a cover transmitting solar radiation.

In solar distillation, maximum temperatures and distillation rates are reached between 2 p.m. and 4 p.m. Then the distilaltion diminishes rapidly in the 130–100° F. range of domestic hot water supplies and the thermal barrier 603, of this invention, may be advantageously positioned over still 655 to conserve the temperature therein. Thus, the morning temperature of the distilland may be 50° F. higher than it would be if allowed to cool to the night sky as in solar stills of conventional design. Owing to this higher temperature in the morning, the distillation process starts earlier and proceeds longer at the optimum rate of highest possible temperatures, thereby producing a larger yield of distilled water.

Throughout the night, hot water may be drawn off through the pipe connection and faucet assembly 656 interconnected and sealed in a suitable manner with said still. A water storage tank (not shown) may be interposed between the still and the faucet of assembly 656 as may a heat exchanger which transfers heat from the distilland 661 to another water supply, in a manner well-known in the art, when the distilland quality is not adequate for domestic use. Distilland may be kept shallow to obtain maximum distillate and the depth may be increased when it is desired to obtain maximum hot water for domestic or other purposes. Means for varying the depth will be described later. Preferably, water is added to still 655 in the morning when the thermal barrier 603 is moved.

Figure 21:
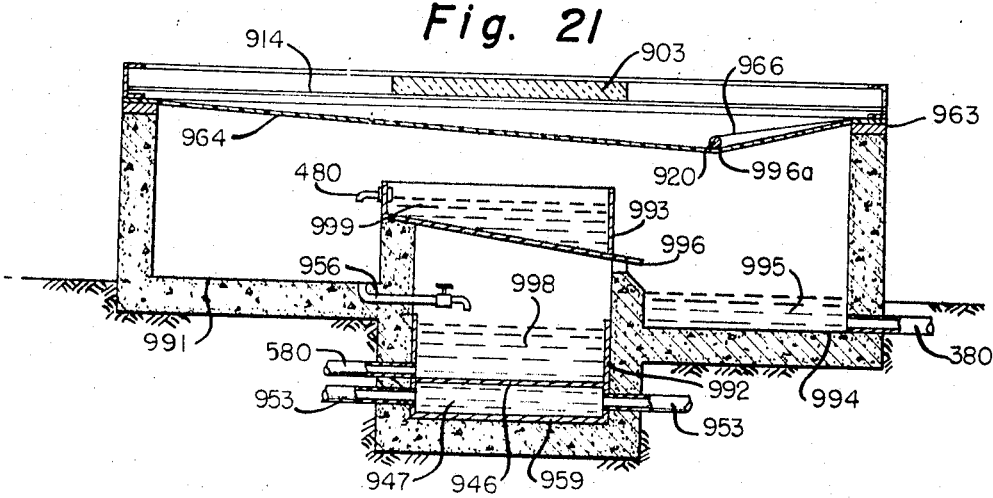
FIGURE 21 is a diagrammatic cross section of an elongated solar still partially covered by a panel of movable insulation.

In another embodiment, with a solar still design differing from prior art, and which may be installed on a roof although illustrated in FIGURE 21 as constructed on the ground, the still is constructed in three sections under a common cover 964 with a thermal barrier 903 which may be moved above said cover but not in contact therewith. The first of said sections consists of a wide but shallow distilland basin 991 preferably having a bottom higher than that of a second distilland basin 992 in a second section of the still. Means consisting of conduits and valves 956 are provided to cause distilland to flow from said first to said second basin, and means 580 are provided to drain concentrated distilland (brine) from the second distilland basin. In the second section of the still, under the cover and overlying the second distilland basin, is a third distilland basin 993 the bottom of which is preferably at a higher level than the first distilland basin. Means are provided to permit excess distilland introduced through a distilland feed pipe (not shown) to overflow through a conduit 480 to the first basin; or the first basin may be provided with a separate feed line. Preferably, the first and third basins are shallower than the second basin which, with greater depth, is able to contain all of the distilland from the first basin.

Adjacent to the first or second sections of said still, and preferably with a bottom below that of the third distilland basin 993 to permit collection of condensate by gravity flow from the underside thereof, is a third section of the still comprising a distillate reservoir 994 with an assembly 380 of conduits, valves and, if necessary, a pump for removing distillate 995. Condensate collected on the cover 964, or on the under surface of the third distilland basin, is conducted, by virtue of the shapes thereof or through collecting troughs positioned with conduits in suitable relation thereto, to a point of discharge 996 and 996a into the distillate reservoir. Point of discharge 996a is formed when the cover 964 is deflected downward by a weighting means 920 held in position by tiecord 966 fastened to framing member 963 supporting the cover 964. The materials from which this embodiment are made have been described herein or are well known in the art of solar stills.

In operation, distilland in the first and third basins is distilled during the daytime by solar radiation transmitted through the cover. The vapors are primarily condensed on the cover and are drained into the distillate reservoir 995. When solar radiation and distillation rate have passed their peaks, or at any suitable time, hot distilland 998 from the first basin is drained into the second basin 992 so that it does not lose heat by direct radiation to the sky as does distilland 999 remaining in the third basin 993. Vapors from the hot distilland 998 formerly in the first basin 991 then condense on the cooler under surface of the third basin 993 giving up latent heat to said third basin and causing distilland 999 therein to distill for a longer time than it would if hot distilland from the first basin had not been drained into the underlying second basin 992 to cause multiple effect distillation. The temperature of the distilland in both the second and third basins is higher the following morning than it would be if distilland 998 of the first basin 991 had been allowed to cool to the night sky in said first basin. The warm distilland 998 in the second basin, except for that portion desired to be drained, can be pumped back into the first basin 991 through a suitable conduit 580 and pumping means (not shown) and additional make-up water added to the first and third basins as needed. With warm distilland in both the first and third basins, distillation starts at an earlier hour in the day. This, combined with multiple effect distillation in the second section of the still, substantially increases the daily production of the still. The still may be elongated or circular in shape.

While the foregoing embodiment has been described with reference to a single second basin 992 underlying the third basin 993, it is obvious that distilland 998 from the first basin 991 may be drained into a plurality of basins underlying one another and all underlying what has been referred to as the third basin 993, and all being adapted to drain condensate into a distillate reservoir, and all thus increasing the multiple effect distillation. Moreover, while operable without the movable thermal barrier 903 of the present invention, direct loss of heat by radiation to the night sky from distilland 999 in the third basin 993 may be retarded by movable thermal barrier means 903. By moving said thermal barrier 903 from a first position overlying the distillate reservoir 990 to a second position overlying at least part of the third basin 993, loss of heat from the third basin is retarded. Simultaneously, distillate 995 in the then-exposed distillate reservoir 994 can cool to the night sky. The distillate 995 is maintained at a low temperature during the day when the thermal barrier 903 is returned from the second position to the first position. In a suitably designed still, the cooled distillate 995 serves as a condensor on which at least a portion of the vapors from the first and third distilland basins are condensed. It is obvious that the thermal barrier 903 of this embodiment may be mounted either under or over the cover 964 of the solar still as long as it does not interfere with the distillation process.

In FIGURE 13 is shown the embodiment of my invention in which a domestic hot water supply is drained through a conduit and faucet assembly 656 which may have a storage tank or a heat exchanger interposed between still 655 and the point of use of the hot water. I now describe the heat exchanger being advantageously located within the distilland of the solar still. In the embodiment of my still illustrated in FIGURE 21, in which distilland from a first basin is drained into a second basin underlying a third basin, the bottom of the second basin 992 may be the top of a metal or plastic hot water tank 959 through which water of high quality may be made to pass by suitable means 953. Heat from the distilland 998 in the second basin 992 is then conducted through the wall 946 of the underlying hot water tank 959 to the water 947 therein. By another means, heat exchange is obtained through a closed system of tubes disposed within the second distilland basin 992 in a manner well understood by those versed in the art. In these embodiments, the resulting hot water supply is not necessarily dependent upon the use of a movable thermal barrier 903 since heat is conserved in the underlying storage tank 959 or the tubes (not shown) by the overlying distilland 999 in the third basin 993 and by the distilland 998 which may purposely be left in the second basin. When a tube heat exchanger or a hot water supply tank underlies distilland in stills of prior design, such as 655 of FIGURE 13, the movable thermal barrier becomes essential to conserve heat otherwise lost to the night sky.

In prior design solar water heaters, expensive collectors consisting of sloping black metal absorbers with attached water circulation systems heat water with a thermosiphon action. The heated water at the top of the collector rises through a pipe to an insulated storage tank at an elevated position while colder water returns from the tank to the lower part of the collector through another pipe. This system requires many pressure-tight joints, long pipelines, a storage tank separate from the heat collector and it places concentrated load on roof members on which the tank is mounted. Moreover, the unsightly tank often is camouflaged as a chimney at extra cost. Initial cost and operating and maintenance expenses caused this prior type of water heater to lose the popularity it once held in Florida.

Figure 22:
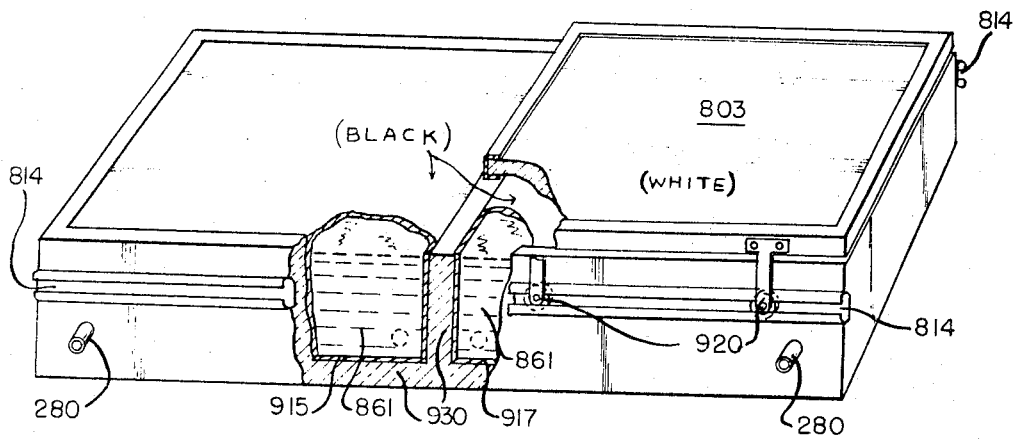
FIGURE 22 is a diagrammatic perspective view, partially cut-away, of a combined hot water heater and water cooler.

In an embodiment of my invention, illustrated in FIGURE 22, water 861 may be heated in one tank and cooled in another with the movable thermal barrier of my invention. In this more simplified version of an embodiment disclosed in my parent application Ser. No. 482,027 copending, two tanks or containers 915 and 917 made of metal or plastic are fastened by suitable means to a roof or other structure preferably orientating the tanks toward the equator. The tanks are mounted adjacently and each has a water inlet (shown as a dotted circle in the breakaway portion of FIGURE 22) and a water outlet 280 which may be insulated by conventional materials. If cylindrical pressure tanks are used, the under half and the ends of each tank are insulated; if rectangular non-pressure tanks 915 and 917 are used, the under surfaces and the sides are protected by suitable insulation 930. The exposed portion (shown black) of each tank capable of receiving solar radiation and of radiating heat to the night sky is preferably blackened by paint or by an electrodeposit or other means.

Along the tops and bottoms of tanks disposed at the same heights, or along the sides of rectangular or cylindrical tanks disposed at different heights, as in FIGURE 22, a trackway 814 is mounted for rollers 920 or for a knife-edge runner assembly identical to those previously described. A panel of insulation 803 generally shaped to parallel and overlie the black surfaces of the tanks, equal in size to the larger of the two tanks, is mounted on the trackway 814 to be moved by means previously described. Sealing means, such as 22, 23, and 25 of FIGURE 1, may be added to reduce heat leakage at the periphery of the insulation panel 803, if needed.

During daytime, the thermal barrier 803 is over the water cooling tank 915 to reduce absorption of heat while permitting water 861 in the heating tank 917 to be heated through its blackened surface. At sunset, the thermal barrier is positioned over the water heating tank 917 to reduce heat loss from this tank to the night sky and to simultaneously expose the water cooling tank 915 to the night sky. In this manner, on a winter day, water above bathing temperature was obtained in the heating tank and preserved at a high temperature throughout the night; during the same diurnal cycle, ice was formed in the cooling tank and was preserved throughout the next day.

In another variation of my heating and cooling system, the black-surfaced water heating tank 917 was caused to underlie a plastic cover capable of transmitting solar radiation and spaced from said tank by suitable means and also underlying a movable thermal barrier. With this embodiment, in summer, water in the heating tank was brought to the boiling point and a high temperature was maintained throughout the night. Because polystyrene insulation does not withstand this high temperature, polyurethane, glass wool, or vegetable fiber insulation 930 should be used.

Lumber driers utilizing solar energy are being developed by the United States Forest Products Laboratory. A fan actuated by electricity, or wind, circulates hot air over a black solar heat absorber and through wet lumber covered by a low-cost plastic film. Grain, fruit, and tobacco driers have been built in a similar manner as have space heaters for animal sheds. In most such installations, heating is indirect and there is considerable loss of heat at night whereas direct absorption and less heat loss at night can result from applying my invention. The movable thermal barrier may be formed from reflective materials shaped to concentrate solar radiation onto the product being dried or onto a solar energy collector of the high thermal capacity type. The movable insulation may be positioned at night to prevent heat loss from the product being dried or from the high thermal capacity collector thus causing the product to dry more at night.

While my movable thermal barrier maintains highest temperatures when used over a transparent cover spaced above a black surface, it cools water better when no such cover overlies the black surfaced cooler, and it maintains the coldest water when mounted over an open pond. Water directly exposed to the night sky apparently loses heat by evaporation and by radiation to the universe. About 6 a.m., the temperature usually reaches a low, approximately equal to the wet-bulb temperature if the pond is less than two and one-half inches deep or a few degrees higher if the pond is six inches deep. In hot-dry climates, the wet-bulb and roof-pond temperatures frequently are 20 to 22° F. colder than the lowest air temperature of night—an effect valuable for modulating temperatures within enclosures.

FIGURE 13 illustrates my invention applied to a roof pond 657 with water 761 contained in the same manner as the distilland 661 in still 655. A cover similar to 664 on still 655 may be used over pond 657 if it is essential to prevent evaporation—it being understood that water temperatures will be a few degrees higher when using a cover. A water inlet assembly (not shown) includes a float valve and an overflow pipe to maintain a predetermined depth of water 761 in pond 657. Movable thermal barrier 603 is positioned either over or away from pond 657 by means previously described with respect to solar still 655.

Roof pond 657 interconnects with food cooler 658 through a hole 673 in pond liner 760—a seal being made by a pressure ring 674 to prevent water leakage. The food cooler 658 consists of a cabinet 675 primarily formed from insulation 730 sandwiched between sheets of metal 676 and having a door 677 opening into a storage space with shelves 678 supported by means usual on a refrigerator. A metal wall 679 suitably sealed to cabinet 675 forms the storage space within food cooler 658 and confines water 761 which surrounds the storage space and interconnects with pond 657. A drain 680 is provided with a valve and conduit assembly (not shown) to remove water 761 from the food cooler 658 and the pond 657.

With a large diameter hole 673 interconnecting pond 657 and food cooler 658, cold water from the pond flows downward to the bottom of the food cabinet by virtue of its density and water warmed by contents on shelves 678 rises to the pond 657 where it can be cooled to the night sky. In another design, two pipes may be used to set up a thermosiphon action to keep the coldest water in the food cabinet. One pipe would connect the food cabinet at a point near drain 680 with pond 657 while the second interconnection would be from the top of cabinet 658 as shown in FIGURE 13 as 673. By these means, using my movable thermal barrier, the temperature within the enclosure comprising the food cabinet 658 may, in a hot-dry region, remain near the freezing point six months of the year and the rest of the year average 16° F. below night air temperature. During periods of high humidity, the pond temperature and that within the food cabinet approximates the 6 a.m. air temperature.

Figure 23:
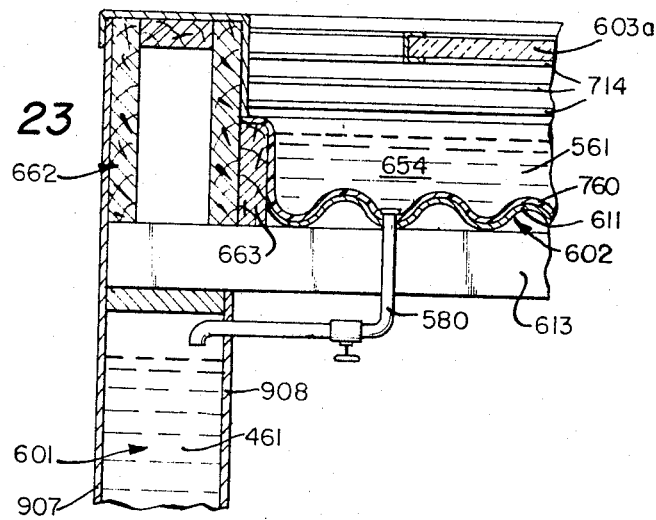
FIGURE 23 is a diagrammatic fragmentary sectional view of a portion of the roof, roof pond, and wall of FIGURE 13.

Returning to my process for modulating temperatures in a manner to heat an enclosure in winter and to cool it in summer, I now describe the embodiment of FIGURE 13 in which roof pond 654 covers a portion of the building structure. Pond 654 consists of exposed water 561 confined in the same manner as water 761 in the cooling pond 657 with the important exception that no insulation corresponding to 630 exists between the liner and the corrugated roof sheets which are identical to 760 and 611 respectively. This is better shown in FIGURE 23 in which portions with like numbers correspond with portions in FIGURE 13. With no intervening insulation, heat transfer occurs between air in the rooms under pond 654 and water 561 in said pond. Returning to FIGURE 13, the temperature of pond 654 and the walls 604, the floor 605, and the contents of the rooms underlying pond 654 tend to equalize.

Because of the large area involved, it is frequently desirable to divide my movable thermal barrier into several panels 603a, 603b, 603c, shown in a perspective sectional view, which move, as previously described, on different levels of trackway 714. Interacting projections and seals (not shown) on framing members 670 of panels 603a, 603b, 603c cause 603b and 603c to move in the same direction as 603a is moved by drawcords 466 and 566 operated from within the building. Roof pond 654 is shown existing only over the left and central portions of the building, but not over the portion to the right which may be utility areas such as carport, porch, closets, recreation rooms and the like. Barrier 603a–603b–603c is essentially coextensive with roof pond 654, in this embodiment, when moved toward left parapet 662. Moved toward right parapet 762, the panels 603a, 603b, and 603c assume a stacked relationship exposing all of pond 654 to absorption of solar energy on a winter day, or to loss of heat on a summer night.

The degree of temperature modulation in rooms underlying pond 654 can be controlled either by moving thermal barrier 603a–603b–603c at predetermined hours over pond 654 of constant depth, or by moving it over said pond of variable depth. If the pond is only two inches deep, to much heat may be absorbed in too little water and produce an objectionable high radiation to the head of an occupant or it might equalize the temperature in the room at an excessively high level. The thermal barrier could, in such case, cover pond 654 at an earlier hour in the day than that providing maximum solar radiation, or the depth of pond 654 could be increased to six inches so that the total available solar heat is absorbed but the temperature of pond 659 remains lower than it would were there less depth. Means for varying the depth of a pond are well known and may consist of a sliding sleeve in an overflow drain or a series of drains at different heights, each drain controlled by a different valve. These variable-depth means and the water inlet for pond 654 are not shown in FIGURE 13.

Although roof ponds have been used in prior art to reduce summer heat loads on roofs of air-conditioned buildings, this has proved less satisfactory than the use of thick insulation. In winter, roof ponds have been drained to prevent freezing; and no use has previously been made of them in winter. With my movable thermal barrier, the pond does not freeze but rather becomes a means for heating in winter and it is used for cooling more effectively than prior art in summer. This dual use makes ponding economical and desirable. If available solar energy is inadequate for winter needs when using an open pond, a plastic cover may be applied over the pond, in the manner of solar still 655 of FIGURE 13, to obtain a higher temperature in the pond.

During a full summer day, water evaporation from roof ponds of prior art is high; 7/16 inch of water may evaporate. My pond is exposed in summer only at night and is kept cool and covered during the day; it loses only 1/16 inch of water in a day. Also, my method does not increase the moisture within an enclosure during the cooling operation as does the forced-air evaporative cooler of prior art. High humidities are not only oppressive and tend to be unhealthy, but cause mildew, wood warpage and other damage. If, in hot-dry areas, the humidity should be excessively low when using my thermal barrier method, it is possible to humidify the air within an enclosure by circulating it through the space overlying roof pond 654 and underlying the movable thermal barrier 603a–603b–603c.

Although in most instances the human comfort zone can be maintained within an enclosure using a roof pond and a movable thermal barrier, it is sometimes desirable to have water confined in the walls of the building or enclosure either to supplement or to distribute the heat collected in the roof pond. In FIGURE 13, wall 601 is shown as a water wall, of a type described later, with drain 780 at the bottom of the wall. On the outer surface is shown fixed insulation 630 which restricts heat gain or loss to the inside surface of the wall. Water 461 filling the cavities in wall 601 may be static to add interior heat storage and reduce the range of thermal variation, or it may be connected, through conduit and valve 580 shown in FIGURE 23, with the water 561 in roof pond 654 and drained, through drain 780 shown in FIGURE 13, as desired to fill wall 601 with either hot or cold water from pond 654.

Insulation 630 is most frequently permanently fastened externally on wall 601 of FIGURE 13, although it is possible to mount it in a manner to make it the movable thermal barrier of my invention, and thus heat can be selectively absorbed or dissipated through wall 601. The water confined in a wall, such as 601 with insulation moved to another position, is not cooled to so low a temperature by night sky radiation as is water in an enclosed roof pond which, in turn, does not get so cold as an exposed roof pond. Therefore water walls are primarily of value to supplement thermal modulation with roof ponds.

Like roof ponds, water walls have not been used extensively because advantages contributed to them by my invention have not hitherto been known. To clarify my embodiment using water walls 101 and 601 of FIGURES 9 and 13 respectively, details are shown in FIGURES 14 to 20 which disclose novel types of water walls and methods for forming them. It has been customary in prior art to use rigid elements to directly confine water in the wall. This necessitated costly fabrication of water-tight tanks or laborious sealing of panels or other confining elements. By contrast, I have found a simple and effective means to form a low-cost water wall. I have further found a means for controlling thermal convection of water within said water wall. By controlling convection, I equalize the temperature from the top to the bottom of the wall, preventing water from rising any substantial distance as it warms, thus reducing drafts in rooms partially enclosed by such walls.

Wall fragment 901 of FIGURE 14 shows water 961 confined within a flexible plastic liner 960 of low vapor transmission characteristics, such as tubular layflat polyethylene film approximately 6 mils thick, and having a drain 980 in a bottom sealed portion and an inlet 971 with an air vent 972 in the top portion. Inlet 971 is interconnected by a metal or plastic conduit and a suitable valve means (not shown) to roof pond 654 of FIGURE 13, or it may be connected, alternatively, to a domestic water supply. Drain 980 is fitted with a valve (not shown).

While it is unusual for tubular layflat polyethylene to have pinholes which permit water leakage, liner 960 of FIGURE 14 is shown within a second liner 960a having a separate drain 880, which removes any water leakage through a pinhole in liner 960. Liner 960a is preferably the second wall of a double tubular bag-like enclosure for confining water 961 introduced into the wall cavity after framing is complete—although, in FIGURE 14, framing brace 912 is shown inserted between the two plastic liners. Water inlet 971 and air vent 972 are sealed to inner liner 960 and pass through holes in liner 960a and in a wall framing member 982.

Wall framing members 982 collectively form the framing of wall 901. When said framing members are of wood, they may be fastened by nails 983 or by screws; when of metal, the framing members may be bolted or welded to form a rigid wall. In FIGURE 15, a fragment of wall 901 in cross section shows framing member 982 fastened by bolt 950 embedded in concrete floor slab 905 over footing 909. On the inner and outer face of wall 901 are shown sheathing materials 907 and 908 which may be of pressed fiberboard or aluminum sheets fastened to framing members 982 by nails 983, screws or bolts. A molding strip 981 closes the space between sheathing sheet 908 and floor 905.

In FIGURE 15, water 961 is shown confined in a single flexible liner 960 which conforms to the shape of the cavity formed by framing members 982, as more fully shown in FIGURE 14, and sheathing materials 907 and 908. The significance of my use of a flexible liner such as 960 is threefold. First, the liner is readily fabricated from low-cost plastic tubing available in different compositions and of any reasonable length. It is easily transported in compact rolls and may be sealed by electronic heating means, adhesives, or clamping devices. In FIGURES 14 and 18, plastic liners 960 and 960a are shown folded over and sealed at closure 984. These sealing techniques are far simpler than those of prior art for forming water-tight walls. Secondly, flexible liner 960 conforms to irregular shapes such as the head of bolt 950, or framing brace 912, thereby eliminating concentrated loading which could rupture a more rigid lining placed over such projections. Thirdly, cross braces 912, or other means, can be added to partially divide wall 901 into a series of compartments, as shown in FIGURES 14 and 15, which interconnect but tend to restrict convection currents in water 961. By restricting convection currents, the temperature of water 961 in compartments near the floor remains nearly the same as in compartments near the ceiling instead of being warmer near the ceiling as would result from the tendency of warmed water to rise in an unrestricted water wall. A wall of more uniform temperature does not cause drafts within an enclosure nor radiate heat non-uniformly to occupants therein. My flexible liner for a water wall provides means to minimize these effects.

In FIGURE 16, a section of flexible tubing 960, suitable for a water wall, is shown as being formed into partially closed compartments of predetermined length by seals 985 which leave an unsealed portion 986 to permit water introduced at opening 987 to fill the various compartments of the tubing sealed at the bottom. FIGURE 17 illustrates the manner in which tubing 960 of FIGURE 16 with sealed end 987 tends to fill the cavity in wall 901 when the tubing inserted into the wall cavity is filled with water and when the segment lengths between seals 985 of FIGURE 16 essentially equal the spacing between sheathing members 907 and 908 fastened to framing member 982 of FIGURE 17. Interconnecting channels between segments of the tubing occur at unsealed portions 986.

In wall 901 of FIGURE 17, I have retarded vertical convection of a liquid within tubing 960 to prevent temperature differentials at different heights of a water wall. With sheathing materials 907 and 908 of metal, or other highly conductive and heat-radiating character, vertical temperature differentials caused by conduction exert themselves over no greater distance than the thickness of the wall. The wall 901 of FIGURE 17 is more suited to confine static fluids whereas wall 901 of FIGURE 14 is more suited to use where the confined liquids are to be periodically changed.

Walls 901 of FIGURES 14, 15, and 17 must withstand considerable lateral pressure. For this reason, I prefer metal sheeting as the wall sheathing 907 and 908. Metal sheeting can readily be fastened to framing 982 and is placed in tension by the lateral pressure exerted by fluid in the flexible liner 960. In addition to having great strength in tension, which permits the use of thin sheets, an impact against sheathing 908 would not readily break said sheathing. Rather, sheathing 908 bends inward slightly transferring the force to the fluid in flexible liner 960 which is raised thereby or which in turn distributes the force over a large area of sheathing material 907. After the force of the impact is thus dissipated, sheathing material 908 returns to the shape of its static condition.

FIGURE 18 illustrates the manner in which a partially segmented tubing 960 of FIGURE 16 can fill a cavity wall while enclosed in a second plastic liner 906a not segmented. Unsealed portions 986 of tubing 960 permit water to fill each compartment when added through inlet 971. Air vent 972 and tubing closure 984 are shown as are framing members 982 with fasteners 983.

FIGURES 19 and 20 illustrate the manner in which cavities of a hollow block wall may be filled with a fluid, such as water. Concrete or ceramic blocks, much used, have hitherto not been adaptable to form a water wall because of the porosity of the blocks and leakage at the mortar joints. Irregular shapes occur in the wall cavities owing to misalignment of blocks, to mortar flow into the cavities or to mortar drippage piled up in the cavity at the bottom of the wall. These irregularities preclude using a rigid water-tight liner which could substantially fill the space within the wall cavity.

As shown in the embodiment of FIGURE 20, I may double back, at point 988, a length of flexible tubing 960 open at the ends so that a fluid within said tubing forms two columns within cavities 989 of blocks 906 bonded with mortar 990 to form wall 901 over floor slab 905. The tubing 960 is also shown sealed at closure 984. Although normal irregularities of a hollow block wall partially restrict vertical convection of liquid in wall 901, I prefer, instead of the simple tubing 960 of FIGURE 20, tubing partially sealed in the manner of 985 of FIGURE 16 to form compartments vertically oriented in the cavities of wall 901 of FIGURE 20 rather than laterally oriented as shown in FIGURES 17 and 18.

FIGURE 19 represents a single hollow block 906 used in wall 901 of FIGURE 20. One cavity 989 of block 906 is shown containing the doubled-back tubing 960 of FIGURE 20. It is obvious cavity 989 could be filled by a single column of fluid and that this requires less plastic for tubing 960. This would place more reliance upon a leak-tight seal on tubing 960 at the bottom of the cavity than does doubling back tubing 960 to form two columns of fluid as shown in FIGURE 20.

Many additional embodiments of my invention could be described as combinations with embodiments disclosed. For example, hot water from either pond 654 or pond 655 of FIGURE 13 could be drained into wall 601 constructed in the manner of walls 901 of FIGURES 14, 15, 17, 18, or 20. At a different season, cold water from pond 654 or pond 657 could be drained into said wall. It furthermore may be advantageous for reasons of cost or for protection against contamination and evaporation to have ponds 654, 657, and within solar still 655 either uncovered or covered when the liquid heated or cooled is to be transferred for heat exchange or use in the ways described. Moreover, pond liquid may be transferred into a floor or other component designed in the manner of water walls disclosed.

In addition to preferring a pond horizontally oriented for more efficient solar heating and for cooling to the zenith atmosphere, I prefer that insulation move horizontally over a horizontal pond to a position not over said pond. Hinged insulation panels 30 of FIGURE 1 mounted over the ponds of FIGURE 13 or mounted on a vertical water wall externally are aerodynamically unstable, require frequent adjustment to permit maximum heating and cooling effects as the sun position varies, and are more costly to construct than the sliding panels of my invention.

While the embodiments of the invention illustrated in FIGURES 1 through 23 have been described with considerable particularity and other embodiments have also been generally referred to, it is expressly understood that the invention is not restricted thereto, as the essence of the disclosed invention is capable of receiving a variety of expressions which will readily suggest themselves to those skilled in the art. Obviously, changes may be made in the arrangement, proportion and composition of parts and certain features may be used with other features without departing from the spirit of this invention. I do not wish, therefore, to be limited to the precise details of construction and operation set forth but desire to avail myself of all aspects within the scope of the appended claims.

What is claimed is:

1. In the method for controlling heat exchange between the universe and an enclosure constructed of a first portion oriented in a plane of minimal exposure to zenith radiation and a second portion oriented in a plane of greater exposure to zenith radiation, one of said portions being of higher heat storage characteristics than the other of said portions, the improvement which comprises:
    (a) positioning, during a first period of the diurnal temperature cycle, a thermal barrier substantially parallel to said first portion to retard said heat exchange through said first portion while permitting said heat exchange through said second portion, and
    (b) positioning, during a second period of said temperature cycle, said thermal barrier in a position other than parallel to said first portion to permit said heat exhange through said first portion while retarding said heat exchange through said second portion.

2. In the method for controlling heat exchange between the universe and an enclosure having at least one portion of high heat storage exposed on one side to the universe, the improvement which comprises:
    (a) positioning a thermal barrier on one side of said portion of said enclosure during a period of temperatures higher than the mean of the diurnal temperature cycle, and
    (b) positioning said thermal barrier on the opposite side of said portion during a period of temperatures lower than the mean of the diurnal temperature cycle.

3. In the method for controlling heat exchange between the universe and more than one enclosure by means of a thermal barrier, the improvement which comprises:
    (a) positioning said thermal barrier in a first position to retard said heat exchange through a substantial portion of a first enclosure during a first period of the diurnal temperature cycle, and thereby
    (b) removing, essentially simultaneously, said thermal barrier from a second position in which said thermal barrier retards said heat exchange through a substantial portion of a second enclosure, and
    (c) positioning said thermal barrier in said second position during a second period of said temperature cycle, and thereby
    (d) removing, essentially simultaneously, said thermal barrier from said first position.

4. An apparatus for controlling temperatures within an enclosure having in combination:
    (a) a body of liquid confined in a horizontal plane permitting heat exchange between the zenith sky and said body of liquid which is supported over said enclosure and is separated therefrom by at least one impervious member permitting heat exchange between said body of liquid and said enclosure, (b) a movable thermal barrier having a surface area equal to at least a major portion of the surface of said body of liquid, and (c) means for moving said thermal barrier, (d) means for supporting said movable thermal barrier from a first position overlying said body of liquid to a second position overlying an area other than that occupied by said body of liquid.

5. An apparatus for controlling the temperature of a liquid having in combination:

(a) means for confining a body of said liquid in a horizontal plane permitting heat exchange between the zenith sky and said body of liquid, (b) a movable thermal barrier having a surface area equal to at least a major portion of the surface of said body of liquid, and (c) means for supporting said thermal barrier when moving said thermal barrier from a first position overlying said body of liquid to a second position overlying an area other than that occupied by said body of liquid.

6. In the method for controlling heat exchange between the universe and substances having high heat storage wherein it is desired to maintain a first such substance at a higher temperature than a second such substance by means of a thermal barrier; the improvement which comprises:

(a) positioning said thermal barrier in a first position overlying a major portion of said first substance during a first period of high temperature in the diurnal cycle to retard said heat exchange with said first substance, and (b) removing, essentially simultaneously, said thermal barrier from a second position over a substantial portion of said second substance to permit said exchange with said second substance, and (c) positioning said thermal barrier in said second position during a second period of lower temperature in said diurnal cycle to retard heat exchange between said second substance and the universe, and (d) removing, essentially simultaneously, said thermal barrier from said first position to permit said heat exchange with said first substance.

7. The method according to claim 6 in which at least one of said substances is a liquid.

8. The method according to claim 7 in which said liquid is transferred to an enclosure at least partially surrounding a third substance whose temperature is controlled by the transferred liquid.

9. An apparatus for controlling the temperature of a liquid having in combination:

(a) at least two bodies of liquid confined in a manner permitting heat exchange on at least one side of confining members, said side being similarly disposed with respect to a heating or cooling source, (b) a movable thermal barrier having a surface area equal to at least a major portion of the surface of said side of the first of said bodies of liquid, and (c) means for supporting said thermal barrier when moving said thermal barrier from a first position substantially overlying said first body of liquid to a second position substantially overlying a second body of liquid to control the temperatures of said first and second bodies of liquid.

10. An apparatus for controlling temperature within an enclosure and having in combination:

(a) a body of liquid confined in a horizontal plane permitting heat exchange between the zenith sky and said body of liquid, (b) a movable thermal barrier having a surface area equal to at least a major portion of the surface of said body of liquid, (c) means for supporting and moving said thermal barrier from a first position substantially overlying said body of liquid to a second position other than that overlying said body of liquid, and (d) means to transfer liquid from said body of liquid to a cavity wall of said enclosure said cavity wall being constructed to confine said liquid and to exchange heat between said liquid and the space within said enclosure contacting said wall thereby controlling the temperature of said space with said liquid transferred from said body of liquid the temperature of which is controlled by moving said thermal barrier.

11. The apparatus of claim 10 in which the enclosure is in the form of a cabinet and having in addition substances within said cabinet whose temperatures are controlled by the temperature of the space within said cabinet.

12. An apparatus for heat storage and thermal exchange within a building comprising in combination:

(a) a structural portion of said building capable of thermal exchange with space within said building and having at least one cavity with walls constructed to withstand the pressure of a liquid filling said cavity, (b) at least one liner of material adequately flexible to substantially conform to the shape of at least a portion of said cavity when said liner is within said cavity and is filled with a liquid, and (c) a liquid confined within said liner and within said cavity to increase the heat capacity of said structural portion containing said liquid thereby affecting the thermal exchange between said structural portion and said space within said building.

13. An apparatus for heat storage and thermal exchange within a building comprising in combination:

(a) a structural portion of said building capable of thermal exchange with space within said building and having at least one cavity with walls constructed to withstand the pressure of a liquid filling said cavity, (b) at least one liner of material adequately flexible to substantially conform to the shape of at least a portion of said cavity when said liner is within said cavity and is filled with a liquid, (c) a liquid confined within said liner and within said cavity to increase the heat capacity of said structural portion containing said liquid thereby affecting the thermal exchange between said structural portion and space within said building, and (d) a projecting member of said structural portion shaped to cause said flexible liner containing said liquid to form at least two partially closed intercommunicating compartments within said cavity and thereby restricting thermal convection of the liquid within said liner within said cavity.

14. An apparatus for heat storage and thermal exchange within a building comprising in combination:

(a) a structural portion of said building capable of thermal exchange with space within said building and having at least one cavity with walls constructed to withstand the pressure of a liquid filling said cavity, (b) at least one liner of material adequately flexible to substantially conform to the shape of at least a portion of said cavity when said liner is within said cavity and is filled with a liquid, (c) a liquid confined within said liner and within said cavity to increase the heat capacity of said structural portion containing said liquid thereby affecting the thermal exchange between said structural portion and space within said building, and (d) said liner having been partially sealed to form at least two intercommunicating compartments which restrict thermal convection of the liquid within said liner within said cavity.

(References on following page)

References Cited

UNITED STATES PATENTS

| | | | |
|---|---|---|---|
| 1,889,238 | 11/1932 | Clark | 126—271 |
| 2,559,870 | 7/1951 | Gay | 165—49 |
| 2,595,905 | 5/1952 | Telkes | 126—270 |
| 2,639,551 | 5/1953 | McKee | 52—750 XR |
| 2,969,918 | 1/1961 | Phelps | 237—1 |
| 2,857,634 | 10/1958 | Garbade et al. | |
| 3,077,190 | 2/1963 | Allen | 126—271 |
| 3,146,774 | 9/1964 | Yellot | 126—271 |

OTHER REFERENCES

"Solar House Heating—A Problem of Heat Storage" by Maria Telkes; from the May 1947 issue of "Heating and Ventilating" pages 72 and 73 relied upon.

FRED C. MATTERN, JR., *Primary Examiner.*

MANUEL ANTONAKAS, *Assistant Examiner.*

U.S. Cl. X.R.

165—49, 53; 126—270; 52—71; 237—1